United States Patent
Chao et al.

(10) Patent No.: US 10,474,865 B2
(45) Date of Patent: Nov. 12, 2019

(54) FINGERPRINT IDENTIFICATION SYSTEM AND ELECTRONIC DEVICE

(71) Applicant: SHENZHEN GOODIX TECHNOLOGY CO., LTD., Shenzhen (CN)

(72) Inventors: Kuohao Chao, Shenzhen (CN); Mengta Yang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 97 days.

(21) Appl. No.: 15/782,843

(22) Filed: Oct. 12, 2017

(65) Prior Publication Data
US 2018/0089488 A1  Mar. 29, 2018

Related U.S. Application Data

(63) Continuation of application No. PCT/CN2016/100451, filed on Sep. 27, 2016.

(51) Int. Cl.
*G06K 9/28* (2006.01)
*G06K 9/00* (2006.01)
(Continued)

(52) U.S. Cl.
CPC .......... *G06K 9/0002* (2013.01); *G06F 3/041* (2013.01); *G06F 3/044* (2013.01); *G06F 3/0418* (2013.01);
(Continued)

(58) Field of Classification Search
CPC .................................................. G06K 9/0002
See application file for complete search history.

(56) References Cited

U.S. PATENT DOCUMENTS

| 5,940,526 A | 8/1999 | Setlak et al. |
| 6,681,033 B1 * | 1/2004 | Yano ........................ G01D 5/24 382/108 |

(Continued)

FOREIGN PATENT DOCUMENTS

| CN | 103679163 A | 3/2014 |
| CN | 104217193 A | 12/2014 |

(Continued)

OTHER PUBLICATIONS

Don Tuite, "Understanding Noise Terms in Electronic Circuits", Electronics Design, from webstie https://www.electronicdesign.com/analog/understanding-noise-terms-electronic-circuits, dated Mar. 2, 2012, pp. 1-4. (Year: 2012).*

(Continued)

*Primary Examiner* — Brian Werner

(57) ABSTRACT

Provided is a fingerprint identification system, comprising: a plurality of first pixel circuits; a first sensing circuit for sensing a contact capacitance and outputting a first output signal, where the first output signal contains a big signal component and a small signal component, and the small signal component correlates with a change amount of the contact capacitance; at least one second pixel circuit; a second sensing circuit for outputting a second output signal, where the second output signal is equal to the big signal component; and a differential amplifying circuit for amplifying a difference value between the first output signal and the second output signal so as to generate an amplifying output signal, where the amplifying output signal correlates with the small signal component.

9 Claims, 4 Drawing Sheets

(51) Int. Cl.
*G06F 3/041* (2006.01)
*G06F 3/044* (2006.01)

(52) U.S. Cl.
CPC ............... *G06K 9/00053* (2013.01); *G06F 2203/04107* (2013.01)

(56) References Cited

U.S. PATENT DOCUMENTS

| | | |
|---|---|---|
| 7,031,886 B1 | 4/2006 | Hargreaves |
| 9,298,967 B2 | 3/2016 | Franza et al. |
| 2006/0049834 A1 | 3/2006 | Umeda |
| 2008/0040079 A1 | 2/2008 | Hargreaves |
| 2008/0069413 A1 | 3/2008 | Riedijk et al. |
| 2008/0317300 A1 | 12/2008 | Pai et al. |
| 2009/0153152 A1 | 6/2009 | Maharyta et al. |
| 2012/0200307 A1 | 8/2012 | Maharyta et al. |
| 2013/0294662 A1 | 11/2013 | Franza et al. |
| 2013/0315451 A1 | 11/2013 | Franza et al. |
| 2015/0185267 A1 | 7/2015 | Maharyta et al. |
| 2015/0248574 A1 | 9/2015 | Mrazek et al. |
| 2016/0171274 A1 | 6/2016 | Franza et al. |
| 2016/0291765 A1* | 10/2016 | Shen ................ G06F 3/0416 |
| 2018/0060640 A1 | 3/2018 | Mrazek et al. |

FOREIGN PATENT DOCUMENTS

| | | |
|---|---|---|
| CN | 105224155 A | 1/2016 |
| CN | 105335715 A | 2/2016 |
| CN | 205121586 U | 3/2016 |
| CN | 105893921 A | 8/2016 |
| CN | 205680105 U | 11/2016 |
| KR | 20010012634 A | 2/2001 |
| WO | 2009/078944 A1 | 6/2009 |

OTHER PUBLICATIONS

Vijayaraghavan et al., "Electrical noise and mitigation—Part 1: Noise definition, categories and measurement", EE Times, taken from website https://www.eetimes.com/document.asp?doc_id=1274125, dated Dec. 16, 2008, pp. 1-4. (Year: 2008).*
International Search Report for International Application No. PCT/CN2016/100451, Applicant: Shenzhen Goodix Technology Co., Ltd., dated Jun. 30, 2017, 5 pages.

* cited by examiner

FINGERPRINT IDENTIFICATION SYSTEM AND ELECTRONIC DEVICE

CROSS-REFERENCE TO RELATED APPLICATIONS

This application is a continuation of International Application No. PCT/CN2016/100451, filed on Sep. 27, 2016, the disclosure of which is hereby incorporated by reference in its entirety.

TECHNICAL FIELD

The present disclosure relates to a fingerprint identification system and an electronic device, and in particular, relates to a fingerprint identification system and an electronic device which can reduce influence of a parasitic capacitance.

BACKGROUND

With the development of science and technology, more and more portable electronic devices such as mobile phones, digital cameras, tablet computers, laptop computers and the like have become indispensable in people's life. Since the portable electronic devices are generally used by individuals and store some private data, the data stored in the electronic device, such as address books, pictures, personal information and the like, is privately owned. If an electronic device is lost, the data therein may be used by others, which may cause unnecessary losses. An electronic device may be prevented from being used by others by means of password protection. However, a password is easily leaked or cracked. Therefore, data security is low. In addition, users may use an electronic device only when inputting a correct password. If the password is forgotten, much inconvenience may be caused to the users. Therefore, a personal fingerprint identification system has been currently developed for identity authentication to improve data security.

In the prior art, a capacitive fingerprint identification system is an extremely popular fingerprint identification means, which employs a contact layer to receive a contact from a user finger, and senses a capacitance change of the contact layer so as to determine finger ridges or finger valleys of a fingerprint of the user. In order to avoid that the contact layer receives interference from other circuits, a shield layer is usually laid out below the contact layer in a circuit layout of the prior art so as to generate a shielding effect, thereby avoiding interference generated by a circuit below the shield layer to the contact layer. However, a parasitic capacitance may be generated between the contact layer and the shield layer, and a capacitance value of the parasitic capacitance is often greater than a capacitance value of a contact capacitance generated from a contact, which influences determination of the capacitance value of the contact capacitance by a capacitive sensing circuit or a capacitive fingerprint identification system, thereby reducing precision of fingerprint identification.

SUMMARY

A primary objective of the present disclosure thus lies in providing a fingerprint identification system and an electronic device which can reduce both influence of a parasitic capacitance and sensitivity to temperature and noise.

To solve the above technical problem, the present disclosure provides a fingerprint identification system. The fingerprint identification system includes: a plurality of first pixel circuits, a first pixel circuit in the plurality of first pixel circuits forming a contact capacitance with a finger; a first sensing circuit, coupled to the first pixel circuit, for sensing the contact capacitance and outputting a first output signal, where the first output signal contains a big signal component and a small signal component, and the small signal component correlates with a change amount of the contact capacitance; at least one second pixel circuit; a second sensing circuit, coupled to a second pixel circuit of the at least one second pixel circuit, for outputting a second output signal, where the second output signal is equal to the big signal component; and a differential amplifying circuit, coupled to the first sensing circuit and the second sensing circuit, for amplifying a difference value between the first output signal and the second output signal so as to generate an amplifying output signal, where the amplifying output signal correlates with the small signal component.

Preferably, the second sensing circuit includes: a contact layer, coupled to a first driving circuit to receive a first drive signal, the contact layer receiving a contact of the finger; a first shield layer, disposed below the contact layer; a first metal layer, disposed below the first shield layer, and coupled to a second driving circuit to receive a second drive signal; and a second metal layer, disposed below the first metal layer, where the first shield layer and the second metal layer are coupled to the second driving circuit to receive a third drive signal; and the first metal layer is coupled to the second sensing circuit.

Preferably, in a driving phase, the first driving circuit drives the contact layer to a positive voltage, and the second driving circuit drives the first shield layer, the first metal layer and the second metal layer to the positive voltage; and in a sensing phase, the first driving circuit provides the contact layer with a first voltage.

Preferably, the second pixel circuit further includes a third metal layer having the same horizontal position as the second metal layer and spaced with the second metal layer, and the third metal layer receives a fixed voltage.

Preferably, the second sensing circuit further comprises a second shield layer having the same horizontal position as the first shield layer and spaced with the first shield layer, and the second shield layer receives a fixed voltage.

Preferably, the first sensing circuit includes: a contact layer for receiving a contact of the finger, the contact layer forming the contact capacitance with the finger, and the contact layer coupled to a driving circuit and the sensing circuit; and a first shield layer, disposed below the contact layer.

Preferably, in a driving phase, the driving circuit drives the contact layer to a positive voltage.

Preferably, the first sensing circuit further comprises a second shield layer having the same horizontal position as the first shield layer and spaced with the first shield layer, and the second shield layer receives a fixed voltage.

Preferably, the differential amplifying circuit is a programmable gain amplifier.

The present disclosure further provides an electronic device. The electronic device includes: an operating circuit; and a fingerprint identification system, coupled to the operating circuit, and the fingerprint identification system including: a plurality of first pixel circuits, a first pixel circuit in the plurality of first pixel circuits forming a contact capacitance with a finger; a first sensing circuit, coupled to the first pixel circuit, for sensing the contact capacitance and outputting a first output signal, where the first output signal contains a big signal component and a small signal component, and the small signal component correlates with a change amount of the contact capacitance; at least one second pixel circuit; a second sensing circuit, coupled to a second pixel circuit of the at least one second pixel circuit, for outputting a second output signal, where the second output signal is equal to the big signal component; and a differential amplifying circuit, coupled to the first sensing circuit and the second sensing circuit, for amplifying a difference value between the first output signal and the second output signal so as to generate an amplifying output signal, where the amplifying output signal correlates with the small signal component.

A fingerprint identification system and an electronic device provided by the present disclosure employ a dummy pixel circuit to generate a dummy output signal, and further eliminate the effect of a parasitic capacitance, so as to promote precision and performance of capacitance sensing or fingerprint identification.

DESCRIPTION OF EMBODIMENTS

In order to make the objectives, technical solutions, and advantages of the present disclosure clearer, the present disclosure is further described in detail below by reference to the accompanying drawings and the embodiments. It should be understood that the embodiments described here are only exemplary ones for illustrating the present disclosure, and are not intended to limit the present disclosure.

In a traditional fingerprint identification system, an output signal of a pixel circuit is influenced by parasitic capacitance inside the pixel circuit and a sensing circuit so that a signal component in the output signal of the pixel circuit that correlates with a change amount of a contact capacitance is not significant; and the output signal of the pixel circuit is also influenced by temperature and noise, so that precision of fingerprint identification is reduced. Therefore, in addition to a normal pixel circuit, the present disclosure further includes a dummy pixel circuit, employs the dummy pixel circuit to generate a dummy output signal to offset signal components in output signals of a plurality of normal pixel circuits that are influenced by parasitic capacitance, temperature and noise, and performs amplifying and subsequent signal processing on fingerprint signal components in the output signals of the plurality of normal pixel circuits so as to determine finger ridges or finger valleys, and improve precision of finger identification.

Figure 1:
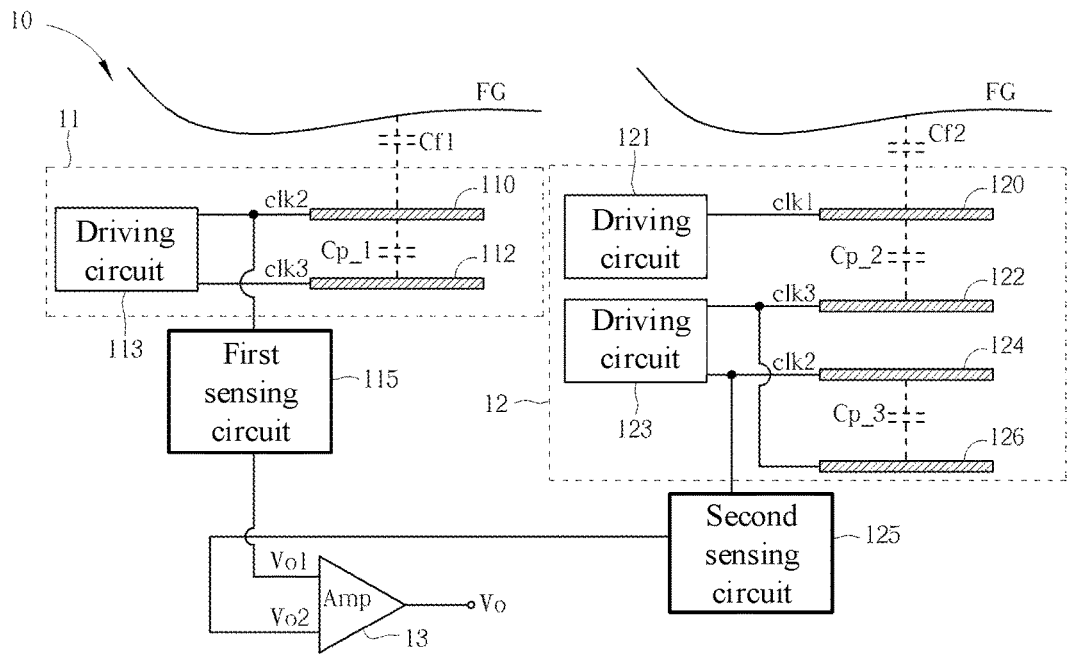
FIG. 1 is a schematic diagram of a fingerprint identification system according to an embodiment of the present disclosure.
Figure 2:
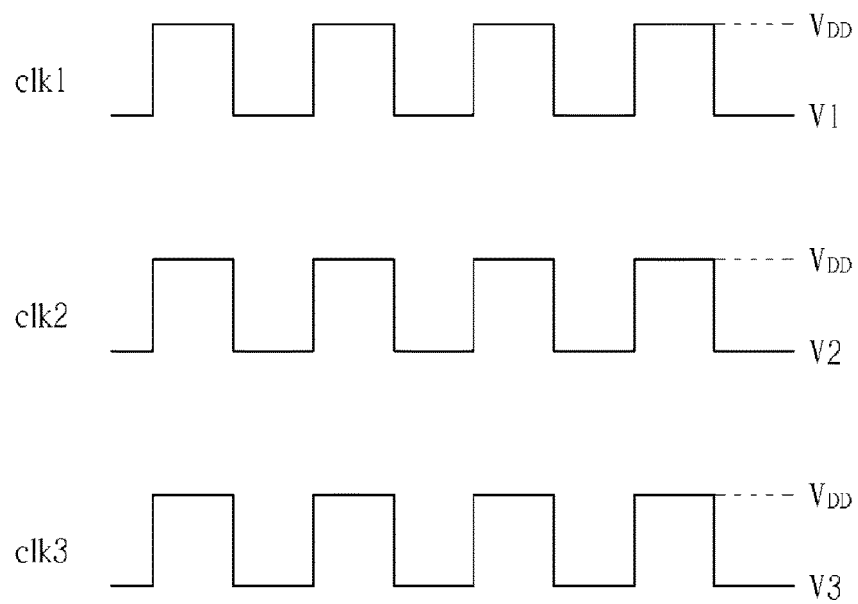
FIG. 2 is waveform diagrams of a plurality of clock signals according to an embodiment of the present disclosure.

Please refer to FIG. 1 and FIG. 2 for circuit structures of a normal pixel circuit and a dummy pixel circuit. FIG. 1 is a schematic diagram of a fingerprint identification system 10 according to an embodiment of the present disclosure, and FIG. 2 is waveform diagrams of clock signals clk1, clk2 and clk3 according to an embodiment of the present disclosure. For the convenience of illustration, FIG. 1 depicts a schematic diagram of a normal pixel circuit of a plurality of normal pixel circuits and a dummy pixel circuit of a fingerprint identification system 10. As illustrated in FIG. 1, the fingerprint identification system 10 includes a normal pixel circuit 11, a dummy pixel circuit 12, a first sensing circuit 115, a second sensing circuit 125 and a differential amplifying circuit Amp. Both the normal pixel circuit 11 and the dummy pixel circuit 12 can receive a contact of a finger FG, and form a contact capacitance $Cf\_1$ and a contact capacitance $Cf\_2$ with the finger FG, respectively. The first sensing circuit 115 is coupled to the normal pixel circuit 11, for sensing the contact capacitance $Cf\_1$ and outputting a first output signal Vo1; in addition, the second sensing circuit 125 is coupled to the dummy pixel circuit 12, for outputting a second output signal Vo2. And the first output signal Vo1 contains a big signal component $\overline{Vo1}$ and a small signal component $\Delta Vo1$ (i.e., the first output signal Vo1 may be represented as $Vo1=\overline{Vo1}+\Delta Vo1$), where the big signal component $\overline{Vo1}$ may be an average of the first output signal Vo1, while the small signal component $\Delta Vo1$ correlates with a change amount $\Delta Cf\_1$ of the contact capacitance $Cf\_1$, and is a fingerprint signal for fingerprint identification. It should be noted that the dummy pixel circuit 12 may be appropriately designed so that the second output signal Vo2 is equal to the big signal component $\overline{Vo1}$ of the first output signal Vo1 (i.e., the second output signal Vo2 may be represented as $Vo2=\overline{Vo1}$). The differential amplifying circuit Amp receives the first output signal Vo1 and the second output signal Vo2, for amplifying a difference value (Vo1−Vo2) between the first output signal Vo1 and the second output signal Vo2 so as to generate an amplifying output signal VO, where the amplifying output signal VO is amplified only for the difference value (Vo1−Vo2). In one embodiment, the differential amplifying circuit Amp is a programmable gain amplifier (PGA). The differential amplifying circuit Amp may be coupled to an analog-to-digital converter (ADC) and a back-end circuit (not drawn in FIG. 1) so as to perform subsequent signal processing on the amplifying output signal VO, and determine whether the normal pixel circuit 11 corresponds to finger ridges or finger valleys of the finger FG.

In other words, the first output signal Vo1 corresponding to the normal pixel circuit 11 correlates with the contact capacitance $Cf\_1$ corresponding to the normal pixel circuit 11, that is, the first output signal Vo1 contains the fingerprint signal (i.e., the small signal component $\Delta Vo1$). In another aspect, the second output signal Vo2 corresponding to the dummy pixel circuit 12 is merely used to offset a signal component of the first output signal Vo1 that is influenced by parasitic capacitance, temperature and noise, and the second output signal Vo2 does not contain the fingerprint signal (i.e., the contact capacitance $Cf\_2$ corresponding to the dummy pixel circuit 12 does not influence the second output signal Vo2). The fingerprint identification system 10 employs the differential amplifying circuit Amp to amplify the difference value (Vo1−Vo2) between the first output signal Vo1 and the second output signal Vo2, that is, amplifying the fingerprint signal for subsequent signal processing.

To be specific, as illustrated in FIG. 1, the normal pixel circuit 11 includes a contact layer 110, a shield layer 112 and a driving circuit 113. Both the contact layer 110 and the shield layer 112 are metal layers in an integrated circuit layout, where the contact layer 110 is a layer of top metal for receiving a contact of the finger FG, the contact layer 110 forms the contact capacitance $Cf\_1$ with the finger FG, and the shield layer 112 is a lower metal layer below the top metal layer, that is, the shield layer 112 is laid out just below the contact layer 100 for generating a shielding effect for a circuit below the shield layer 112 so as to avoid interference generated by the circuit below the shield layer 112 to the contact layer 110. And the shield layer 112 forms a parasitic capacitance Cp_1 with the contact layer 110. The contact layer 110 is coupled to the first sensing circuit 115, and furthermore, both the contact layer 110 and the shield layer 112 are coupled to the driving circuit 113 to receive clock signals clk2 and clk3 generated by the driving circuit 113, respectively.

As illustrated in FIG. 2, in a driving phase, the clock signals clk2 and clk3 are at high levels, and in this case, the driving circuit 113 drives the contact layer 110 and the shield layer 112 to a positive voltage $V_{DD}$; and in a sensing phase, the clock signals clk2 and clk3 are at a voltage V2 and a voltage V3, and in this case, the first sensing circuit 115 outputs the first output signal Vo1, where the first output signal Vo1 correlates with the contact capacitance Cf_1 and the parasitic capacitance Cp_1, and the first output signal Vo1 may be represented as Vo1=A*($\overline{Cf\_1}$+ΔCf_1)+B*Cp_1+D, where A, B and D are parameters that correlate with the positive voltage $V_{DD}$ or the driving circuit and the voltage generated thereby, and $\overline{Cf\_1}$ may represent an average of a plurality of contact capacitances formed by a plurality of pixel circuits. In addition, the parameters A, B and D may vary under the influence of temperature or noise.

In another aspect, as illustrated in FIG. 1, the dummy pixel circuit 12 includes a contact layer 120, a shield layer 122, metal layers 124 and 126, a driving circuit 121 and a driving circuit 123. The contact layer 120, the shield layer 122 and the metal layers 124 and 126 are all metal layers in an integrated circuit layout, where the contact layer 120 is a top metal layer for receiving a contact of the finger FG, the contact layer 120 forms the contact capacitance Cf_2 with the finger FG, and the shield layer 122 may be a lower metal layer below the top metal layer, that is, the shield layer 122 is laid out just below the contact layer 120 for generating a shielding effect for a circuit below the shield layer 122 so as to avoid interference generated by the circuit below the shield layer 122 to the contact layer 120. And the shield layer 122 forms a parasitic capacitance Cp_2 with the contact layer 120. In addition, the metal layer 124 may be a lower metal layer of the shield layer 122 (i.e., the metal layer 124 may be laid out/provided below the shield layer 122), and the metal layer 126 may be a lower metal layer of the metal layer 124 (i.e., the metal layer 126 may be laid out/provided below the metal layer 124), and a parasitic capacitance Cp_3 is formed between the metal layer 124 and the metal layer 126. The contact layer 120 is coupled to the driving circuit 121 to receive the clock signal clk1; the metal layer 124 is coupled to the driving circuit 123 to receive the clock signal clk2; and the shield layer 122 and the metal layer 126 are coupled to the driving circuit 123 to receive the clock signal clk3. In addition, the second sensing circuit 125 is coupled to the metal layer 124. It shall be noted that the clock signal clk1 and the clock signal clk2 are generated by different circuits (i.e., the driving circuit 121 generating the clock signal clk1 is different from the driving circuit 123 generating the clock signal clk2), which may further reduce influence of the contact capacitance Cf_2 (and the parasitic capacitance Cp_2) on the second output signal Vo2.

As illustrated in FIG. 2, in a driving phase, the clock signals clk1, clk2 and clk3 are at high levels (a positive voltage $V_{DD}$), and in this case, the driving circuit 121 drives the contact layer 120 to the positive voltage $V_{DD}$, and the driving circuit 123 drives the shield layer 122 and the metal layers 124 and 126 to the positive voltage $V_{DD}$; and in a sensing phase, the clock signal clk1, the clock signal clk2 and the clock signal clk3 are at a voltage V1, a voltage V2 and a voltage V3 respectively, and in this case, the second sensing circuit 125 outputs the second output signal Vo2. In addition, the driving circuit 121 provides the contact layer 120 with the voltage V1, and the second sensing circuit 125 forms the voltage V2, and provides the shield layer 122 and the metal layer 126 with the voltage V3. It shall be noted that in terms of a waveform, the voltage V1 may be equal to the voltage V2, that is, the clock signal clk1 may be a signal with the same waveform as the clock signal clk2. However, the clock signal clk1 and the clock signal clk2 are generated by different circuits respectively. Take the fingerprint identification system 10 as an example, the clock signal clk1 and the clock signal clk2 are generated by the driving circuit 121 and the driving circuit 123, respectively.

It shall be noted that the contact layer 120 receives the clock signal clk1, that is, the driving circuit 121 always applies the positive voltage $V_{DD}$ or the voltage V1 to the contact layer 120 (the contact layer 120 is not floating). And the second sensing circuit 125 is not connected to the contact layer 120, and therefore, the contact capacitance Cf_2 (and the parasitic capacitance Cp_2) would not influence the second output signal Vo2. The second output signal Vo2 may be represented as Vo2=E*Cp_3+F, where E and F are parameters that correlate with the positive voltage $V_{DD}$ or the driving circuit, and may also vary under the influence of temperature or noise.

In addition, the dummy pixel circuit 12 may be appropriately designed so that E*Cp_3+F=A*$\overline{Cf\_1}$+B*Cp_1+D, that is, the second output signal Vo2 is equal to the big signal component $\overline{Vo1}$ of the first output signal Vo1 (Vo2=$\overline{Vo1}$). As a result, the differential amplifying circuit Amp may merely amplify the fingerprint signal (i.e., the small signal component ΔVo1, where ΔVo1=Vo1−Vo2=A*A Cf_1), that is to say, the amplifying output signal VO may be represented as VO=$A_v$*(Vo1−Vo2)=$A_v$*ΔVo1, where $A_v$ represents a gain of the differential amplifying circuit Amp. As a result, the back-end circuit of the fingerprint identification system 10 can determine whether the normal pixel circuit 11 corresponds to finger ridges or finger valleys of the finger FG according to the amplifying output signal VO.

It shall be noted that in the first output signal Vo1, the parameters A, B and D may vary under the influence of temperature or noise. However, in the second output signal Vo2, the parameters E and F may also vary under the influence of temperature or noise. That is to say, a signal component in the first output signal Vo1 that is influenced by temperature or noise may be eliminated (the first output signal Vo1 subtracting the second output signal Vo2) by employing the differential amplifying circuit Amp, and the differential amplifying circuit Amp merely amplifies a finger signal which correlates with the change amount of the contact capacitance ΔCf_1 so as to improve precision of fingerprint identification of the fingerprint identification system 10.

As known from the above description, in addition to a normal pixel circuit (the normal pixel circuit 11), the fingerprint identification system 10 further includes a dummy pixel circuit (the dummy pixel circuit 12), employs the dummy pixel circuit (the dummy pixel circuit 12) to generate a dummy output signal (the second output signal Vo2) so as to offset signal components in output signals of a plurality of normal pixel circuits that are influenced by parasitic capacitance, temperature and noise, and performs amplifying and subsequent signal processing on fingerprint signal components (the small signal component $\Delta Vo1$, where $\Delta Vo1 = A * \Delta Cf\_1$) in the output signals of the plurality of normal pixel circuits to determine finger ridges or finger valleys of the finger FG.

Figure 3:
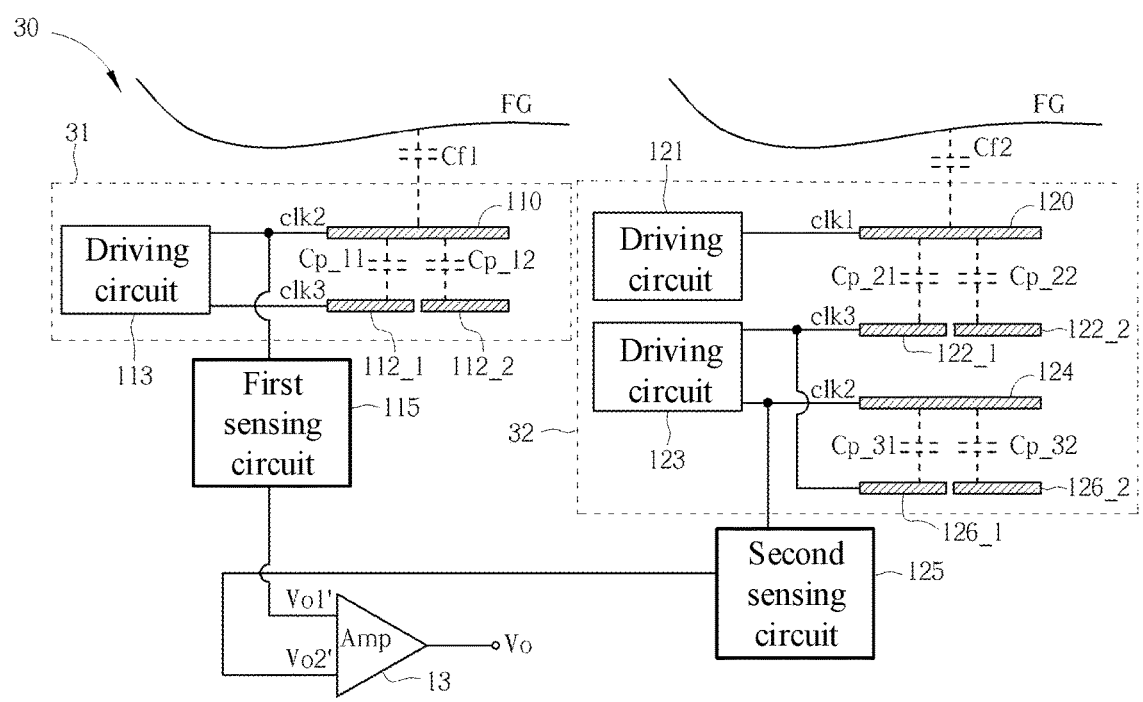
FIG. 3 is a schematic diagram of a fingerprint identification system according to an embodiment of the present disclosure.

It should be noted that the preceding embodiments are used to describe the concepts of the present disclosure. A person skilled in the art may make different modifications or alternations to the present disclosure without any limitation to the above given embodiments. For example, referring to FIG. 3, FIG. 3 is a schematic diagram of a fingerprint identification system 30 according to an embodiment of the present disclosure. The fingerprint identification system 30 is similar to the fingerprint identification system 10. Therefore, like reference numerals are still used to denote like components. Different from the fingerprint identification system 10, a first pixel circuit 31 (a normal pixel circuit) includes a shield layer 112_1 and a shield layer 112_2 which are metal layers at the same layer in an integrated circuit layout (i.e., the shield layer 112_1 and the shield layer 112_2 are spaced with each other, and have the same horizontal position). The shield layer 112_1 is coupled to the driving circuit 113 to receive the clock signal clk3, the shield layer 112_2 receives a fixed voltage or is grounded, and a parasitic capacitance Cp_11 and a parasitic capacitance Cp_12 are formed respectively between the shield layer 112_1 and the contact layer 110, and between the shield layer 112_2 and the contact layer 110. In addition, a second pixel circuit 32 includes a shield layer 122_1, a shield layer 122_2, a metal layer 126_1 and a metal layer 126_2, the shield layer 122_1 and the shield layer 122_2 are metal layers at the same layer in an integrated circuit layout (i.e., the shield layer 122_1 and the shield layer 122_2 are spaced with each other, and have the same horizontal position), and the metal layer 126_1 and the metal layer 126_2 are metal layers at the same layer in the integrated circuit layout (i.e., the metal layer 126_1 and the metal layer 126_2 are spaced with each other, and have the same horizontal position). The shield layer 122_1 and the metal layer 126_1 are coupled to the driving circuit 113 to receive the clock signal clk3, and the shield layer 122_2 and the metal layer 126_2 receive a fixed voltage or are grounded; and a parasitic capacitance Cp_21 and a parasitic capacitance Cp_22 are formed respectively between the shield layer 122_1 and the contact layer 120, and between the shield layer 122_2 and the contact layer 120, and a parasitic capacitance Cp_31 and a parasitic capacitance Cp_32 are formed respectively between the metal layer 126_1 and the metal layer 124, and between the metal layer 126_2 and the metal layer 124. A first output signal Vo1' corresponding to the first pixel circuit 31 may be represented as $Vo1' = A*(\overline{Cf\_1} + \Delta Cf\_1) + B_1*Cp\_11 + B_2*Cp\_12 + D$, and a second output signal Vo2' corresponding to the second pixel circuit 32 may be represented as $Vo2' = E_1*Cp\_31 + E_2*Cp\_32 + F$. Similarly, parameters $B_1$, $B_2$, $E_1$ and $E_2$ may all vary under the influence of temperature or noise. The dummy pixel circuit 12 may be appropriately designed so that the second output signal Vo2' is equal to a big signal component $\overline{Vo1'}$ of the first output signal Vo1' ($Vo2' = \overline{Vo1'}$), where the big signal component $\overline{Vo1'}$ may be represented as $\overline{Vo1'} = A*Cf\_1 + \Delta Cf\_1 + B_1*Cp\_11 + B_2*Cp\_12 + D$. The remaining operating principle of the fingerprint identification system 30 is the same as that of the fingerprint identification system 10, and will not be redundantly described here.

It shall be noted that the fingerprint identification system 30 may be seen as the fingerprint identification system 10 in which the shield layer 112, the shield layer 122 and the metal layer 126 are divided into two portions (i.e., the shield layer 112 is divided into the shield layers 112_1 and 112_2, the shield layer 122 is divided into the shield layers 122_1 and 122_2, and the metal layer 126 is divided into the metal layers 126_1 and 126_2). Non-limitedly, the shield layer 112, the shield layer 122 and the metal layer 126 in the fingerprint identification system 10 may be divided into three, four or more portions so that a second output signal is precisely equal to a big signal component of a first output signal.

Figure 4:
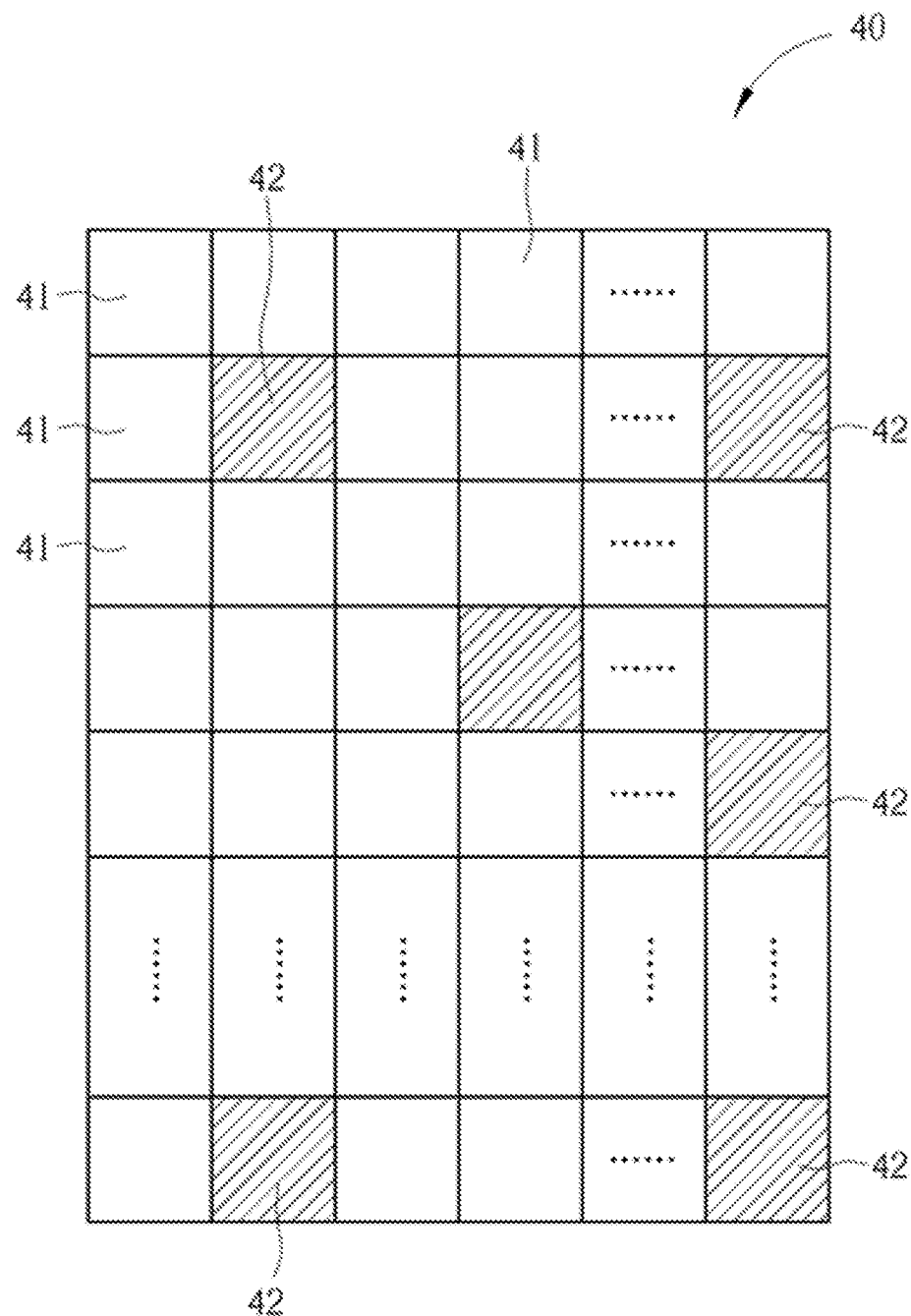
FIG. 4 is a schematic plan view of a fingerprint identification system according to an embodiment of the present disclosure.

Moreover, there is no limitation to a normal pixel circuit and a dummy pixel circuit of a fingerprint identification system of the present disclosure. Referring to FIG. 4, FIG. 4 is a schematic plan view of a fingerprint identification system 40 according to an embodiment of the present disclosure. The fingerprint identification system 40 includes an array of a plurality of normal pixel circuits 41 and a plurality of dummy pixel circuits 42. As illustrated in FIG. 4, the plurality of dummy pixel circuits 42 may be arranged in the array in a random manner. It should be noted that an arranging manner of the plurality of normal pixel circuits 41 and the plurality of dummy pixel circuits 42 depicted in FIG. 4 is merely one embodiment, and the plurality of dummy pixel circuits may be arranged around the array, or in a row or a column of the array, which are not limited herein.

Figure 5:
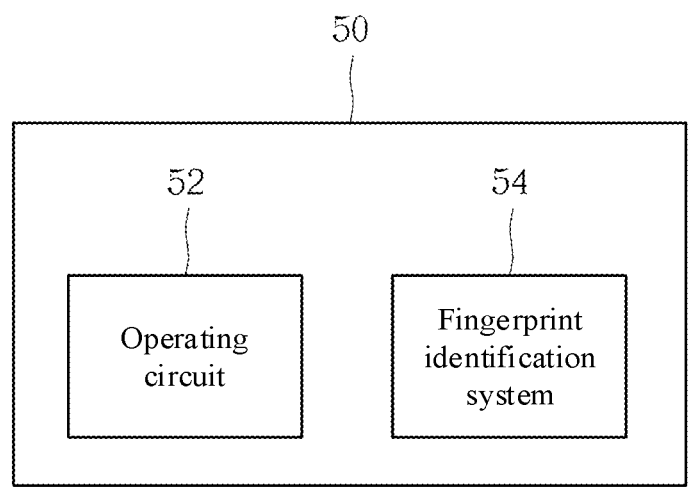
FIG. 5 is a schematic diagram of an electronic device according to an embodiment of the present disclosure.

Further, a fingerprint identification system of the present disclosure may be applied to an electronic device. Referring to FIG. 5, FIG. 5 is a schematic diagram of an electronic device 50 according to an embodiment of the present disclosure. The electronic device 50 may be a tablet computer or a smart phone. As illustrated in FIG. 5, the electronic device 50 includes an operating circuit 52 and a fingerprint identification system 54. The fingerprint identification system 54 is coupled to the operating circuit 52, which may be implemented by the fingerprint identification system 10, the fingerprint identification system 30 or the fingerprint identification system 40. In addition, the operating circuit 52 may include a processor and a storage device, and the storage device may be a read-only memory (ROM), a random-access memory (RAM), or a non-volatile memory (such as an electrically erasable programmable read only memory (EEPROM) or a flash memory).

In conclusion, the present disclosure employs a dummy pixel circuit to generate a dummy output signal to offset a signal component in an output signal of a normal pixel circuit that is influenced by parasitic capacitance, temperature and noise, and performs amplifying and subsequent signal processing on a fingerprint signal in the output signal of the normal pixel circuit to improve precision of finger identification.

The above described embodiments are merely preferred embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A fingerprint identification system, comprising:
a plurality of first pixel circuits, a first pixel circuit in the plurality of first pixel circuits forming a contact capacitance with a finger;
a first sensing circuit, coupled to the first pixel circuit, for sensing the contact capacitance and outputting a first output signal, wherein the first output signal contains a big signal component and a small signal component, and the small signal component correlates with a change amount of the contact capacitance, and the big signal component comprises a signal component influenced by parasitic capacitance, temperature and/or noise;

at least one second pixel circuit;

a second sensing circuit, coupled to a second pixel circuit of the at least one second pixel circuit, for outputting a second output signal, wherein the second output signal is equal to the big signal component; and a differential amplifying circuit, coupled to the first sensing circuit and the second sensing circuit, for amplifying a difference value between the first output signal and the second output signal to generate an amplifying output signal, wherein the amplifying output signal correlates with the small signal component;

wherein the second pixel circuit comprises:

a contact layer, coupled to a first driving circuit to receive a first drive signal, the contact layer receiving a contact of the finger;

a first shield layer, disposed below the contact layer;

a first metal layer, disposed below the first shield layer, and coupled to a second driving circuit to receive a second drive signal; and a second metal layer, disposed below the first metal layer;

wherein the first shield layer and the second metal layer are coupled to the second driving circuit to receive a third drive signal; and wherein the first metal layer is coupled to the second sensing circuit.

2. The fingerprint identification system according to claim 1, wherein in a driving phase, the first driving circuit drives the contact layer to a positive voltage, and the second driving circuit drives the first shield layer, the first metal layer and the second metal layer to the positive voltage; and in a sensing phase, the first driving circuit provides the contact layer with a first voltage.

3. The fingerprint identification system according to claim 1, wherein the second pixel circuit further comprises a third metal layer having the same horizontal position as the second metal layer and spaced with the second metal layer, and the third metal layer receives a fixed voltage.

4. The fingerprint identification system according to claim 1, wherein the second pixel circuit further comprises a second shield layer having the same horizontal position as the first shield layer and spaced with the first shield layer, and the second shield layer receives a fixed voltage.

5. The fingerprint identification system according to claim 1, wherein the first pixel circuit comprises:

a contact layer for receiving a contact of the finger, the contact layer forming the contact capacitance with the finger, and the contact layer coupled to a driving circuit and the sensing circuit; and a first shield layer, disposed below the contact layer.

6. The fingerprint identification system according to claim 5, wherein in a driving phase, the driving circuit drives the contact layer to a positive voltage.

7. The fingerprint identification system according to claim 5, wherein the first pixel circuit further comprises a second shield layer having the same horizontal position as the first shield layer and spaced with the first shield layer, and the second shield layer receives a fixed voltage.

8. The fingerprint identification system according to claim 1, wherein the differential amplifying circuit is a programmable gain amplifier.

9. An electronic device, wherein the electronic device comprises:

an operating circuit; and a fingerprint identification system, coupled to the operating circuit, and the fingerprint identification system comprising:

a plurality of first pixel circuits, a first pixel circuit in the plurality of first pixel circuits forming a contact capacitance with a finger;

a first sensing circuit, coupled to the first pixel circuit, for sensing the contact capacitance and outputting a first output signal, wherein the first output signal contains a big signal component and a small signal component, and the small signal component correlates with a change amount of the contact capacitance, and the big signal component comprises a signal component influenced by parasitic capacitance, temperature and/or noise;

at least one second pixel circuit;

a second sensing circuit, coupled to a second pixel circuit of the at least one second pixel circuit, for outputting a second output signal, wherein the second output signal is equal to the big signal component; and a differential amplifying circuit, coupled to the first sensing circuit and the second sensing circuit, for amplifying a difference value between the first output signal and the second output signal to generate an amplifying output signal, wherein the amplifying output signal correlates with the small signal component;

wherein the second pixel circuit comprises;

a contact layer, coupled to a first driving circuit to receive a first drive signal, the contact layer receiving a contact of the finger;

a first shield layer, disposed below the contact layer;

a first metal layer, disposed below the first shield layer, and coupled to a second driving circuit to receive a second drive signal; and a second metal layer, disposed below the first metal layer;

wherein the first shield layer and the second metal layer are coupled to the second driving circuit to receive a third drive signal; and wherein the first metal layer is coupled to the second sensing circuit.

* * * * *